Patented Mar. 18, 1930

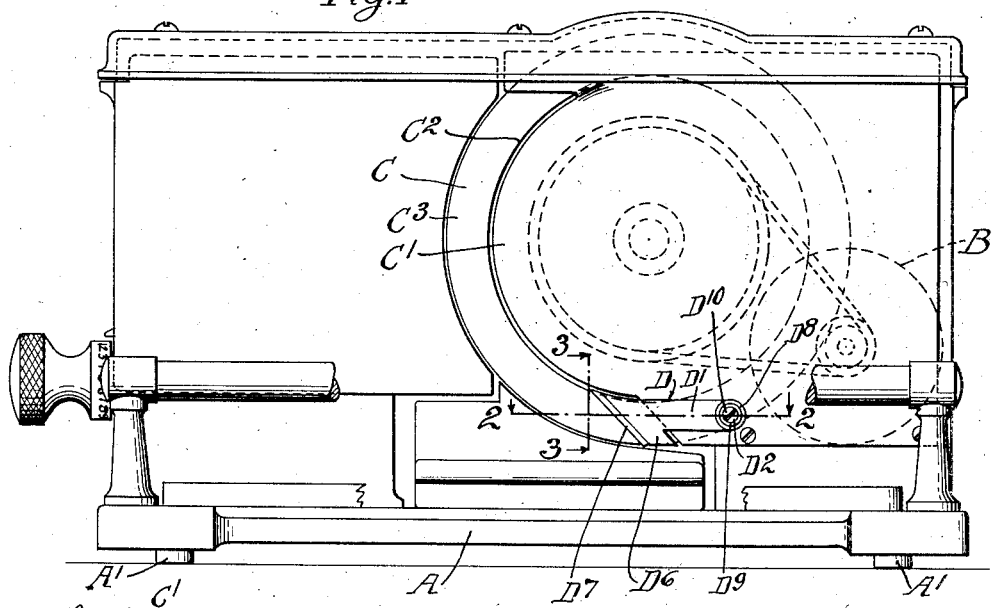

1,750,662

UNITED STATES PATENT OFFICE

WILLIAM J. CAMPBELL, OF INDIANAPOLIS, INDIANA, ASSIGNOR TO AMERICAN SLICING MACHINE COMPANY, OF CHICAGO, ILLINOIS, A CORPORATION OF NEW YORK

SLICING MACHINE

Application filed January 19, 1929. Serial No. 333,652.

My invention relates to a slicing machine and particularly to a machine for slicing meat and has for one purpose the provision of a scraper blade or scraper member which shall operate against the face of the knife in order to remove bits of meat, grease and the like therefrom. An object of my invention is the provision of such a blade which shall have a life of maximum duration, and which shall cause a minimum of noise. Another object is the provision of such a blade which shall conform to irregularities in the face of the knife and which shall conform to the rhythm of rotation of the knife. Another object is the provision of means for adjusting such a blade and for obtaining the delicate adjustments necessary in order to maintain a thin flexible blade in the desired close and even contact with the opposed face of the knife. Other objects will appear from time to time in the course of the specification and claims.

I illustrate my invention more or less diagrammatically in the accompanying drawings, wherein—

Figure 1 is a front elevation;

Figure 2 is a section on the line 2—2 of Figure 1;

Figure 3 is a section on the line 3—3 of Figure 1;

Figure 4 is a partial section similar to Figure 2, illustrating a slight modification;

Figure 5 is a partial elevation of a variant form;

Figure 6 is a section on the line 6—6 of Figure 5;

Figure 7 is a partial elevation of a further variant form;

Figure 8 is a section on the line 8—8 of Figure 7; and

Figure 9 is a vertical section through a variant form of the device shown in Figures 1 to 4.

Like parts are indicated by like symbols throughout the specification and drawings.

A generally indicates any suitable base frame or member provided, for example, with the anti-frictional and noise-deadening supports $A^1$.

Mounted on such base member is any suitable motor means, herein shown as the motor B, from which extends any suitable driving connection to the rotary knife herein shown as C. Positioned in the forward side of the knife is a face plate $C^1$ which penetrates or partially penetrates the hollow $C^2$ formed in the forward face of the knife. It will be observed, for example in Figure 3, that the knife is provided with a peripheral forward raised portion $C^3$ and an inclined rear portion $C^4$, the two converging to form the cutting edge of the knife. In order to throw the cutting edge outwardly beyond the face of the plate $C^1$ the knife is tilted out of parallelism with the face plate, in order to throw one edge forward, as shown in Figure 3. I may employ any suitable means, not herein shown, for conveying meat across the face of the knife and face plate $C^1$, and thus into engagement with the cutting edge of the knife.

In order to free the face and edge of the knife from bits of meat, grease and the like which might tend to penetrate to the rear of the face plate $C^1$ I provide a scraping member, generally indicated as D, which includes a stem or body portion $D^1$ secured as at $D^2$, to the face plate $C^1$. In order to cause or permit the member D to be adjusted properly to the opposed knife face I employ as securing means an assembly including a stud or ball $D^3$ which is indicated in Figure 2 as riveted to the face plate $C^1$ and which is shown in Figure 4 as having a screwthreaded stem $D^4$ with the nut $D^5$ whereby it may be secured to the face plate $C^1$.

The member D will be understood to include beside the stem $D^1$ the enlarged head $D^6$, shown as inclined across the forward raised portion $C^3$ of the knife. This head or T has secured to its edge a flexible blade, for example of steel, $D^7$. I may employ, for example, the blade, or part of the blade, of a safety razor or any other equivalent member. It is advantageous to provide a thin, flexible, resilient, sharp scraping edge, the length of which is preferably slight in relation to the width of the scraping edge. In effect, in the form herein shown, I employ a mere fringe of highly yielding spring steel positioned upon the head $D^6$. The head $D^6$ and the stem $D^1$ are also preferably of spring stock, but either thicker or of less yielding stock than the edge portion $D^7$ itself.

In the use of such a scraper it is important that it conform very closely to the opposed face of the knife in order not only to obtain a proper initial adjustment, but also to permit further adjustment in case of wear of the knife or change of knives. The stem $D^1$ is provided with a cup $D^8$ conforming to the spherical or ball surface of the member $D^3$. $D^9$ is a nut formed to conform to the portions $D^3$ and $D^8$ and $D^{10}$ indicates any suitable securing means, for example a screw. By the employment of such securing means I enable the assembly D to be locked tightly in place at any given adjustment. The ball and socket connection permits the member D to be tilted in such fashion that the edge $D^7$ engages or is uniformly spaced from the face of the knife from edge to edge. The ball and socket connection also permits the arm $D^1$ to be moved toward and away from the face of the knife. A practical method of adjustment is to more or less loosen the holding means, for example the screw $D^{11}$ and to permit the knife edge to take its own position.

The scraper edge $D^7$ will tend to adjust itself to the opposed knife face and when it has so adjusted itself the screw $D^{10}$ can be screwed in and the adjustment made permanent.

In the form of Figures 5 and 6 I employ a rolling abutment E on the face plate $C^1$. $E^1$ indicates a tilting body which may be held by a plurality of screws $E^2$. Secured to the tilting body $E^1$ is the stem $D^1$ and its head $D^6$, as earlier described. By loosening and tightening the various screws $E^2$ it is possible to tilt the blade $D^7$ and the arm $D^1$ into any desired position.

In Figures 7 and 8 I illustrate a further variation in which the blade G which can be of relatively thick spring stock is secured at one end to the face plate $C^1$ as by the screws $G^1$. The blade G is in rolling contact with the stud or projection $G^2$ and may be adjusted in relation to it for example by the screws $G^3$. When one screw is loosened and the other tightened the member G is tilted about its longitudinal axis. In order to obtain the adjustment toward and away from the face of the knife I employ the screw $G^4$.

Referring to Figure 9 the device shown therein is identical with the form shown in Figures 1 to 4 inclusive save for the addition of the rearward projection $D^{20}$ along the upper edge of the scraping member D. It may for instance be formed along the upper edge of the enlarged head portion $D^6$ and projects inwardly a sufficient distance to engage the edge of the face plate $C^1$, in order to prevent the member D from rotating about its pivot and from overlapping or overlying the edge of the face plate $C^1$.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

It is extremely desirable to prevent the entry of portions of meat or other material into spaces behind the guard plate $C^1$. It will be observed that the knife is recessed on its forward face, and that the guard plate $C^1$ penetrates the recess. It therefore follows that any bits or crumbs of material which pass across the front face of the knife will engage the guard plate $C^1$, and access to the space behind the guard plate or shield will thereby be prevented.

The above described scraper for the forward face or edge of the knife is peculiarly efficient for its purpose and obviates many difficulties which are present when scrapers of heavy spring steel, fiber, or the like are employed. In its essence the member includes two distinct parts namely the portion $D^1$ with the head $D^6$, which is preferably but not necessarily of some spring stock, and which preferably has some spring action, and the blade proper $D^7$, which not merely has spring action, but is of such thinness and is of such short length in relation to the elongated member $D^6$ as to be capable of vibrating at a very rapid rate.

Being in the form of a narrow flexible strip of metal it is also possible for waves of vibration to pass transversely along its edge across the face of the knife. In its employment the more rigid portion $D^1$ $D^6$ is so adjusted, in relation to the plate $C^1$ and the knife itself as to position the razor blade $D^7$ in close proximity to, and preferably in slightly yielding contact with the face of the knife. Since the knife normally rotates at a very rapid rate, for example at 800 R. P. M. clearly the inevitable slight inaccuracies of the face of the knife, whether caused by irregularities in the surface of the knife, or by some slight variation of its axis of rotation from perpendicularity to the plate $C^1$, cause variations in the distance between the face of the knife at any given point and the scraper opposed thereto. Because of the rapidity of the rotation of the knife these variations are in the nature of a very rapid pulsation or vibration toward and away from the scraper. Unless the scraper member is able to conform to these vibrations it is inevitable that the distance between scraper and knife will vary and that fine particles will be carried between scraper and knife. On the other hand if a scraper member is thrust against the plane of the knife sufficiently closely to hug the knife, then there is the probability if not certainty of friction and overheating, of wear to the opposed parts, of wastage of power, and of increase in noise. I avoid these eventualities by employing the duplex member above described in which the more rigid portion $D^1 D^6$ exerts a certain yielding action and can conform to major variations or fluctuations, while the small spring strip or blade $D^7$ is so light and so flexible that it conforms readily to the rapid vibration of the knife.

In practice it may be said to get in resonance with the vibration of the knife face. It conforms to the rate and length of vibration of the knife. Nevertheless, notwithstanding its close hugging of the surface of the knife, the frictional contact, the force of the contact, and the area of the contact are insufficient to cause any substantial degree of wear or heating. The scraper itself remains cool to the touch, and it wears down very slowly. It has been applicant's experience that although many thousand slicing machines built in accordance with the teachings of the present application have been put in use, and some of them have been in use for many months, nevertheless, it has been necessary to replace scrapers of this type, whether for wear or for any other reason, in only a scant dozen or two cases.

The action of the scraper blade in hugging the face of the knife and in lifting from it small bits of meat, grease and the like is aided by the fact that the knife edge is inclined to the path taken by any particle on the knife in such fashion that it tends to move these particles outwardly toward the periphery of the knife edge where they are easily sloughed off.

In obtaining an adjustment of this type of scraper, it is extremely important that the edge of the scraper shall uniformly contact the face of the knife, since if there is any tilting of any portion of the scraper edge upwardly away from the knife, the main function of the scraper is to that extent destroyed, and material which should be scraped from the face of the knife will pass beneath the scraper and penetrate to the parts of the slicing machine from which it is desired to exclude grease, small fragments and the like. Also it is important that the tension or pressure of the scraper should be as near as possible uniform across the entire width of the scraper. Otherwise the characteristic oscillation or vibration of the scraper in response to the movement of the opposed knife surface will not be obtained, and the bad fit against the knife will cause friction, wear and heat.

There are several reasons why in practice it is necessary to provide accurate adjusting means. The scraper, in the form of the slicing machine herein shown, is mounted on a guard plate which is in many cases made of enamel metal. Such a plate may warp in the course of enameling, and enamel plates are not turned out true dimensioned as will be the case in a metal surfaced plate. The scraper and its support being of spring stock, they are not in practice turned out so accurately that mere attachment to the face of the guard plate provides a proper fit. Concavity of the knife varies, and also the angular relation of knife to guard plate. Further, knives wear down in use, as they are ground or sharpened, and when a new knife is inserted in the place of a worn one, a further adjustment of the scraper is unnecessary.

By the employment of my structure the scraper blade may easily and accurately be adjusted. The support is initially positioned somewhat loosely on the guard plate and the scraper edge is opposed to the rotating knife and is allowed to adjust itself naturally to the opposed face of the knife. It is then locked in its self-adjusted position. The various forms of my device herein shown have this in common, that all of them permit a twisting adjustment of the scraper that is to say permit the arm on which the scraping edge is mounted to be rotated about an axis generally parallel with its length. They also all permit an adjustment of the scraper edge toward and away from the knife.

Referring to the form of Figure 9 I employ means, indicated as the projection or flange $D^{20}$, for preventing the scraper member D or scraper support D from rotating about its pivot in such fashion as to overlap the face plate $C^1$. It is essential that the cutting edge $D^7$ be at all times exterior to the periphery of the arcuate edge of the face plate $C^1$. It must not be permitted to crawl over it or get out of position, or to overlap the face plate, or to become wedged over the face plate in such fashion as to be withdrawn from scraping engagement with the face of the knife, or in such fashion as to fail to cover the knife edge or the portion of the knife face indicated as $C^3$ for example in Figure 3. In the form shown in Figure 5, where the scraper is held by a plurality of securing means, rotation out of position is impossible. Where a ball and socket joint is used, as in Figure 1 and following, in practice there may be some creeping or rotation of the scraper support in relation to the ball and socket joint and it may be desirable to employ means, in addition to the screw $D^2$, for holding the member D in proper alignment with the knife. I illustrate the flange or rearward projection $D^{20}$ as a practical solution of the problem but with no intention of limiting myself to this specific solution, except so far as I may limit myself by the language of my claims.

The slope of the edge $D^7$ being as shown in

Figure 1 in rotation of the member D is substantially certain to be clockwise, as shown in Figure 1, and to tend to throw the point or inner edge of the blade $D^7$ against or over the edge of the face plate $C^1$. Hence the flange $D^{20}$ is of itself sufficient to hold the scraper member in alignment with the portion $C^3$ of the knife. It will be understood that I consider it within the scope of my invention to employ any other suitable means for preventing rotation of the member D, in either direction, in such fashion as would destroy the alignment between the edge $D^7$ and the knife surface $C^3$.

I claim:

1. In a slicing machine, a knife and means for rotating it, and a scraper member adapted to engage the face of said knife, and a tiltable supporting and adjusting means for said scraper member, said supporting means including a generally spherical surfaced member.

2. In a slicing machine, a knife and means for rotating it, and a scraper member adapted to engage the face of said knife, and a tiltable supporting and adjusting means for said scraper member, said supporting means including opposed members forming a ball and socket joint, and means for locking said members against relative movement.

3. In a slicing machine, a knife and means for rotating it, and a scraper member adapted to engage the face of said knife and adjusting means for said scraper member, said means being adapted to permit adjustment of said scraper member toward and away from the knife and to admit rotation of said scraper member in a plane generally parallel with the face of said knife.

4. In a slicing machine, a knife and means for rotating it, a scraper member adapted to engage the face of said knife, and supporting and adjusting means for said scraper member, including a convex abutment member opposed to said scraper member.

5. In a slicing machine, a knife and means for rotating it, a scraper member adapted to engage the face of said knife, and supporting and adjusting means for said scraper member, including a convex abutment member opposed to said scraper member, and means for tilting said scraper member in relation to said convex abutment and for fixing its position in relation thereto.

6. In a slicing machine, a knife and means for rotating it and a scraper member adapted to engage the face of said knife, a convex abutment member, the scraper member being provided with a portion conforming to said convex abutment and means for locking said scraper member in relation to said convex abutment.

7. In a slicing machine, a knife and means for rotating it and a scraper member adapted to engage the face of said knife, a convex abutment member, the scraper member being provided with a portion conforming to said convex abutment and means for locking said scraper member in relation to said convex abutment, the opposed faces of the abutment and the scraper member being generally spherical.

8. In a slicing machine, a rotary knife and means for rotating it, a thin, resilient and readily flexible scraper adapted to engage the face of the knife adjacent the cutting edge, a more sturdy, but resilient carrier for said scraper, and means by which the scraper carrier may readily be adjusted angularly relative to the engaged face of the knife.

9. The structure according to claim 8, characterized by the employment of a universal joint support for the scraper-carrier, and means by which said carrier may be held in adjusted position.

10. In a slicing machine, a knife and means for rotating it, and a scraper member adapted to engage the face of said knife, and a tiltable supporting and adjusting means for said scraper member, said supporting means including a generally spherical surfaced member opposed to a portion of said scraper member, and means for holding said scraper member against rotation about said spherical surfaced member.

11. In a slicing machine, a knife and means for rotating it, and a scraper member adapted to engage the face of said knife, and a tiltable supporting and adjusting means for said scraper member, said supporting means including a generally spherical surfaced member opposed to a portion of said scraper member, and means for holding said scraper member against rotation about said spherical surfaced member, including a projection on said scraper member adapted to engage an opposed portion of the slicing machine.

12. In a slicing machine, a knife and means for rotating it, and a scraper member adapted to engage the face of said knife and adjusting means for said scraper member, said means being adapted to permit adjustment of said scraper member toward and away from the knife and to admit rotation of said scraper member in a plane generally parallel with the face of said knife, and means for preventing such rotation after the scraper member is adjusted.

13. In a slicing machine including a knife and means for rotating it, and a guard plate positioned before said knife, a scraper member adapted to engage the face of said knife and means for adjustably securing said scraper member upon said guard plate, said adjusting and securing means including a ball and socket joint.

14. In a slicing machine including a knife and means for rotating it, and a guard plate positioned before said knife, a scraper member adapted to engage the face of said knife and means for adjustably securing said scraper member upon said guard plate, said adjusting and securing means including a universal connection between the scraper member and the plate.

15. In a slicing machine, a knife and means for rotating it, and a scraper member adapted to engage the face of said knife, and a tiltable supporting and adjusting means for said scraper member, including a universal connection intermediate the scraper member and the slicing machine.

Signed at Indianapolis county of Marion and State of Indiana, this 15th day of January 1929.

WILLIAM J. CAMPBELL.